(12) United States Patent
Lei et al.

(10) Patent No.: US 11,745,562 B1
(45) Date of Patent: Sep. 5, 2023

(54) COUPLING THERMAL MANAGEMENT SYSTEM OF PURE ELECTRIC VEHICLE BASED ON PHASE CHANGE HEAT STORAGE

(71) Applicant: SHANDONG UNIVERSITY OF SCIENCE AND TECHNOLOGY, Qingdao (CN)

(72) Inventors: Shurong Lei, Qingdao (CN); Song Xin, Qingdao (CN); Ziliang Zhao, Qingdao (CN); Xiaoting Zhang, Qingdao (CN); Fangzi Hao, Qingdao (CN); Xu Li, Qingdao (CN); Junlong Liu, Qingdao (CN); Yu Wang, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 18/179,697

(22) Filed: Mar. 7, 2023

(30) Foreign Application Priority Data

Jun. 2, 2022 (CN) .......................... 202210618005.5

(51) Int. Cl.
   *B60H 1/00* (2006.01)
(52) U.S. Cl.
   CPC ..... *B60H 1/00899* (2013.01); *B60H 1/00278* (2013.01); *B60H 1/00392* (2013.01); *B60H 1/00485* (2013.01)
(58) Field of Classification Search
   CPC ............ B60H 1/00278; B60H 1/00392; B60H 1/00485; B60H 1/00899; B60H 2001/00928; F25B 25/005
   See application file for complete search history.

(56) References Cited

U.S. PATENT DOCUMENTS 5,553,662 A * 9/1996 Longardner .......... F24F 5/0021
165/902

FOREIGN PATENT DOCUMENTS

| CN | 209840452 U | 12/2019 |
| CN | 112046240 A * | 12/2020 |

(Continued)

OTHER PUBLICATIONS

First Office Action issued in Chinese Application No. 202210618005.5; dated Jul. 13, 2022; 15 pgs.

(Continued)

*Primary Examiner* — Kun Kai Ma
(74) *Attorney, Agent, or Firm* — HAUPTMAN HAM, LLP (57) ABSTRACT

A coupling thermal management system of a pure electric vehicle based on phase change heat storage. The system includes a refrigerant circuit and a coolant circuit, where heat exchange can be achieved between the refrigerant circuit and the coolant circuit through a plate type heat exchanger. The refrigerant circuit includes an electric compressor, an inside-vehicle heat exchanger, an outside-vehicle heat exchanger, a bidirectional electronic expansion valve, a four-way directional valve, a gas-liquid separator, first three-way valve, a first gate valve, a second gate valve, a plate type heat exchanger and a refrigerant tube. The coolant circuit includes a battery pack, a phase change material, a heat storage heat exchanger, a water pump, a second three-way valve, a third three-way valve, a fourth three-way valve and a coolant tube. The plate type heat exchanger is also included in the coolant circuit.

4 Claims, 3 Drawing Sheets

(56) References Cited

FOREIGN PATENT DOCUMENTS

| CN | 112193014 | A |   | 1/2021  |        |           |
|----|-----------|---|---|---------|--------|-----------|
| CN | 113503660 | A | * | 10/2021 |        |           |
| CN | 114347867 | A | * | 4/2022  |        |           |
| CN | 115476643 | A | * | 12/2022 | ……… | B60H 1/00278 |
| CN | 115648928 | A | * | 1/2023  |        |           |
| WO | WO-2022068606 | A1 | * | 4/2022 | ……… | B60H 1/00271 |

OTHER PUBLICATIONS

Search Report issued in Chinese Application No. 202210618005.5; dated Jul. 6, 2022; 5 pgs.
Notification of Grant issued in Chinese Application No. 202210618005.5; dated Jul. 27, 2022; 3 pgs.

\* cited by examiner

COUPLING THERMAL MANAGEMENT SYSTEM OF PURE ELECTRIC VEHICLE BASED ON PHASE CHANGE HEAT STORAGE

RELATED APPLICATIONS

The present application claims priority from Chinese Application Number 202210618005.5 filed Jun. 2, 2022, the disclosure of which is hereby incorporated by reference herein in its entirety.

TECHNICAL FIELD

The present invention relates to the field of coupling thermal management technologies of pure electric vehicles, and in particular to a coupling thermal management system of a pure electric vehicle based on phase change heat storage.

BACKGROUND

The performance and life span of the power batteries of the pure electric vehicles can be affected by temperature: in a case of excessively high temperature, the life span of the battery packs will be shortened and safety accidents such explosion may even be caused; in a case of excessively low temperature, electrochemical reaction inside the batteries will be slowed down, and thus the charge and discharge efficiency of the battery packs will be reduced and the endurance mileage of the pure electric vehicles will be reduced. Therefore, a battery thermal management system is required for the pure electric vehicles to ensure the battery packs are within a proper working temperature range. On the other hand, since there is no engine waste heat available, it is very difficult to supply heat to a vehicle compartment of the pure electric vehicles in winter. Since a heat pump air-conditioning system has the advantages such as high heating efficiency and a smaller number of parts, it tends to be used in the pure electric vehicles. But, the heat pump air-conditioning system faces the problem that an outer side of an external heat exchanger is frosted at a low temperature, leading to sharp decrease of the heat exchange effect. This problem severely affects the heating effect of the heat pump air-conditioning system and even damages a compressor. Therefore, it is required to defrost the frosted heat exchanger. At present, a common defrost method is a reverse cycle defrosting method in which a four-way valve is used to change a flow direction of a refrigerant such that the refrigerant absorbs heat inside the vehicles and supplies heat to the external heat exchanger, so as to achieve defrosting effect. But, in the reverse cycle defrosting method, the compressor needs to consume additional electric energy and thus reduces the endurance mileage of the pure electric vehicles. Furthermore, because the heat inside the vehicles is absorbed by the heat pump air-conditioning system, the temperature inside the vehicle compartment will be lowered, which may severely affect thermal comfort inside the vehicle compartment. Hence, it is urgent to optimize the reverse cycle defrosting method.

On Oct. 16, 2020, an invention patent named "a non-stop heat pump defrosting system of an electric vehicle and a running method thereof" with the application number of CN111780465A was disclosed below. In this technology, heat generated during operation of the batteries and the motors is used for normal heating and defrosting process of the heat pump air-conditioner; but, the heat generated by the batteries and the motors is to be supplied to inside of the vehicle compartment and the heat exchanger outside the vehicle compartment at the same time during their operation, leading to shortage of heat and hence affecting inside-vehicle heating and outside-vehicle defrosting. On the other hand, the defrosting process requires a higher rotational speed of the compressor, resulting in electric energy loss. On Oct. 12, 2018, an invention patent named "a novel heat pump air-conditioning system of an electric vehicle based on defrosting of phase change energy storage and a control method thereof" with the application number of 201810339756.7 was disclosed below. In this technology, the heat storage of a phase change material is used to supply heat to the external heat exchanger under defrosting working conditions; but, the heat stored by the phase change material comes from the heat pump air conditioner under heating mode. Therefore, an additional electric amount is to be consumed, which is unfavorable for the endurance mileage of the pure electric vehicle.

SUMMARY

For the above technical problems in the prior arts, the present invention provides a coupling thermal management system of a pure electric vehicle based on phase change heat storage, which is designed reasonably to overcome the shortcomings of the prior arts, achieving good effects.

In order to achieve the above object, the present invention provides the following technical solution.

There is provided a coupling thermal management system of a pure electric vehicle based on phase change heat storage, which includes a refrigerant circuit and a coolant circuit, where heat exchange can be achieved between the refrigerant circuit and the coolant circuit through a plate type heat exchanger.

The refrigerant circuit includes an electric compressor, an inside-vehicle heat exchanger, an outside-vehicle heat exchanger, a bidirectional electronic expansion valve, a four-way directional valve, a gas-liquid separator, first three-way valve, a first gate valve, a second gate valve, a plate type heat exchanger and a refrigerant tube.

The four-way directional valve is provided with 4 ports which are a port A, a port B, a port C and a port D respectively. The port A of the four-way directional valve is connected to an inlet of the electric compressor through the gas-liquid separator. The port B of the four-way directional valve is connected to an end of the plate type heat exchanger through the refrigerant tube, and connected to an end of the inside-vehicle heat exchanger through the second gate valve. The port C of the four-way directional valve is connected to an outlet of the electric compressor through the refrigerant tube, and connected to an end of the inside-vehicle heat exchanger through the first gate valve. The port D of the four-way directional valve is connected to an end of the outside-vehicle heat exchanger through the refrigerant tube.

The first three-way valve is provided with 3 ports, which are a port E, a port F and a port G respectively. The port E of the firs three-way valve is connected to the other end of the inside-vehicle heat exchanger through the refrigerant tube; the port F of the firs three-way valve is connected to the other end of the plate type heat exchanger through the refrigerant tube; the port G of the first three-way port is connected to the other end of the outside-vehicle heat exchanger through the bidirectional electronic expansion valve.

The coolant circuit includes a battery pack, a phase change material, a heat storage heat exchanger, a water pump, a second three-way valve, a third three-way valve, a fourth three-way valve and a coolant tube. The plate type heat exchanger is also included in the coolant circuit.

The second three-way valve is provided with 3 ports, which are a port H, a port I and a port J respectively. The port H of the second three-way valve is connected to an end of the battery pack through the coolant tube; the port I of the second three-way valve is connected to an outlet of the water pump through the coolant tube; the port J of the second three-way valve is connected to an end of the plate type heat exchanger and a port L of the third three-way valve through the coolant tube.

The third three-way valve is provided with 3 ports, which are a port K, a port L and a port M respectively. The port K of the third three-way valve is connected to the heat storage heat exchanger through the coolant tube; the port L of the third three-way valve is connected to an end of the plate type heat exchanger and the port J of the second three-way valve through the coolant tube; and the port M of the third three-way valve is connected to an inlet of the water pump through the coolant tube.

The fourth three-way valve is provided with 3 ports, which are a port N, a port O and a port P respectively. The port N of the fourth three-way valve is connected to the other end of the heat storage heat exchanger through the coolant tube; the port O of the fourth three-way valve is connected to the other end of the battery pack through the coolant tube; and the port P of the fourth three-way valve is connected to the other end of the plate type heat exchanger through the coolant tube.

Preferably, the four-way directional valve can switch between two positions, which respectively are: a position by which A and B are in communication, and C and D are in communication; and a position by which A and D are in communication and B and C are in communication. The first gate valve can be opened or closed; and the second gate valve can be opened or closed.

Preferably, the first three-way valve may switch between five positions: which are a position by which E and F are in communication separately, a position by which F and G are in communication separately, a position by which E and G are in communication separately, a position by which the E and G are in communication and F and G are in communication, and a position by which E and F are in communication and F and G are in communication.

Preferably, the second three-way valve can switch between two positions, which are a position by which H and I are in communication separately and a position by which I and J are in communication separately.

The third three-way valve can switch between two positions, which are a position by which K and M are in communication separately and a position by which L and M are in communication separately.

The fourth three-way valve can switch between three positions, which are a position by which N and O are in communication separately, a position by which N and P are in communication separately, and a position by which O and P are in communication separately.

Preferably, a fan is disposed outside the outside-vehicle heat exchanger and the inside-vehicle heat exchanger respectively, and a pressure difference sensor is disposed outside the outside-vehicle heat exchanger to determine whether frosting is present.

Preferably, a temperature sensor is disposed inside the battery pack to detect a temperature of the battery pack.

Preferably, the plate type heat exchanger can be provided for being passed through by a refrigerant and a coolant which are not in direct contact but exchange heat only through the plate type heat exchanger.

Preferably, the heat storage heat exchanger is internally provided with an internal channel for the coolant to flow through. Fins are disposed outside the internal channel to enhance heat exchange. The heat storage heat exchanger is externally wrapped by the phase change material which is externally wrapped by a heat insulation material. The phase change material is an inorganic or organic phase change material with a phase change temperature of about 30° C.

Preferably, a medium in the refrigerant circuit is R134a; and a medium in the coolant circuit is water.

Preferably, the thermal management system has six working modes: a battery preheating mode, a battery heat accumulation mode, a battery cooling mode, a vehicle compartment refrigeration mode, a vehicle compartment heating mode and a defrosting mode.

The present invention has the following technical effects.

1) In the present invention, the phase change material is used for the advantage of large latent heat of the phase change material to provide heat to the outside-vehicle heat exchanger of the heat pump air conditioner under the defrosting working condition, so as to address the problem of insufficient heat supply under the defrosting working conditions in the prior arts. Further, the heat is recovered from waste heat of the batteries and stored into the phase change material by the heat storage heat exchanger. The accumulated heat is not additionally supplied by the heat pump air conditioning system and thus, the total thermal efficiency is higher to save electric energy for the pure electric vehicle.

2) The phase change material in the present invention can provide heat to the vehicle compartment during the defrosting working conditions, and hence, the temperature inside the vehicle compartment is not affected during the defrosting process and therefore, thermal comfort of the driver and the passengers can be guaranteed.

3) The present invention provides multiple thermal management modes for the power batteries, and thus can switch to an optimal thermal management mode based on different use states of the power batteries. In this way, heat dissipation can be performed on the batteries and heating can also be performed on the batteries under cold start state, to ensure the battery pack works in an appropriate temperature range.

Numerals of the drawings are described below: 1—electric compressor, 2—four-way directional valve, 3—outside-vehicle heat exchanger, 4—bidirectional electronic expansion valve, 5—first three-way valve, 6—inside-vehicle heat exchanger, 7—second gate valve, 8—gas-liquid separator, 9—first gate valve, 10—plate type heat exchanger, 11—second three-way valve, 12—water pump, 13—third three-way valve, 14—heat storage heat exchanger, 15—phase change material, 16—fourth three-way valve, 17—battery pack.

DETAILED DESCRIPTION OF THE EMBODIMENTS

The present invention will be further elaborated below in combination with accompanying drawings and specific embodiments.

Figure 1:
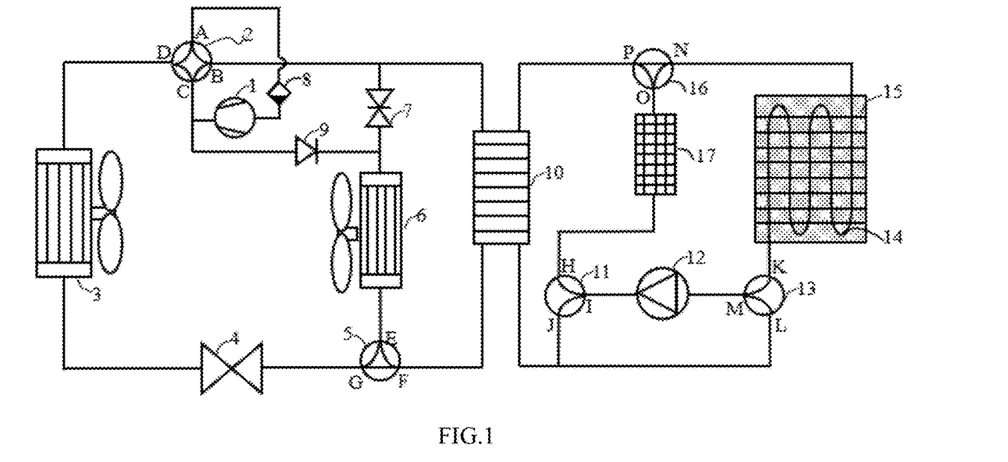
FIG. 1 is a structural schematic diagram of a management system of the present invention.

As shown in FIG. 1, a coupling thermal management system of a pure electric vehicle based on phase change heat storage, including a refrigerant circuit and a coolant circuit, where heat exchange can be achieved between the refrigerant circuit and the coolant circuit through a plate type heat exchanger.

The refrigerant circuit includes an electric compressor 1, an inside-vehicle heat exchanger 6, an outside-vehicle heat exchanger 3, a bidirectional electronic expansion valve 4, a four-way directional valve 2, a gas-liquid separator 8, first three-way valve 5, a first gate valve 9, a second gate valve 7, a plate type heat exchanger 10 and a refrigerant tube.

The four-way directional valve 2 is provided with 4 ports which are a port A, a port B, a port C and a port D respectively. The port A of the four-way directional valve 2 is connected to an inlet of the electric compressor 1 through the gas-liquid separator 8. The port B of the four-way directional valve 2 is connected to an end of the plate type heat exchanger 10 through the refrigerant tube, and connected to an end of the inside-vehicle heat exchanger 6 through the second gate valve 7. The port C of the four-way directional valve 2 is connected to an outlet of the electric compressor 1 through the refrigerant tube, and connected to an end of the inside-vehicle heat exchanger 6 through the first gate valve 9. The port D of the four-way directional valve 2 is connected to an end of the outside-vehicle heat exchanger 3 through the refrigerant tube.

The four-way directional valve 2 can switch between two positions, which respectively are: a position by which A and B are in communication, and C and D are in communication; and a position by which A and D are in communication and B and C are in communication. The first gate valve 9 can be opened or closed; and the second gate valve 7 can be opened or closed.

The first three-way valve 5 is provided with 3 ports, which are a port E, a port F and a port G respectively. The port E of the firs three-way valve 5 is connected to the other end of the inside-vehicle heat exchanger 6 through the refrigerant tube; The port F of the firs three-way valve 5 is connected to the other end of the plate type heat exchanger 10 through the refrigerant tube; the port G of the first three-way port 5 is connected to the other end of the outside-vehicle heat exchanger 3 through the bidirectional electronic expansion valve 4.

The first three-way valve 5 may switch between five positions: which are a position by which E and F are in communication separately, a position by which F and G are in communication separately, a position by which E and G are in communication separately, a position by which the E and G are in communication and F and G are in communication, and a position by which E and F are in communication and F and G are in communication.

The coolant circuit includes a battery pack 17, a phase change material 15, a heat storage heat exchanger 14, a water pump 12, a second three-way valve 11, a third three-way valve 13, a fourth three-way valve 16 and a coolant tube. The plate type heat exchanger is also included in the coolant circuit.

The second three-way valve 11 is provided with 3 ports, which are a port H, a port I and a port J respectively. The port H of the second three-way valve 11 is connected to an end of the battery pack 17 through the coolant tube; the port I of the second three-way valve 11 is connected to an outlet of the water pump 12 through the coolant tube; the port J of the second three-way valve 11 is connected to an end of the plate type heat exchanger 10 and a port L of the third three-way valve 13 through the coolant tube.

The second three-way valve 11 can switch between two positions, which are a position by which H and I are in communication separately and a position by which I and J are in communication separately.

The third three-way valve 13 is provided with 3 ports, which are a port K, a port L and a port M respectively. The port K of the third three-way valve 13 is connected to the heat storage heat exchanger 14 through the coolant tube; the port L of the third three-way valve 13 is connected to an end of the plate type heat exchanger 10 and the port J of the second three-way valve 11 through the coolant tube; and the port M of the third three-way valve 13 is connected to an inlet of the water pump 12 through the coolant tube.

The third three-way valve 13 can switch between two positions, which are a position by which K and M are in communication separately and a position by which L and M are in communication separately.

The fourth three-way valve 16 is provided with 3 ports, which are a port N, a port O and a port P respectively. The port N of the fourth three-way valve 16 is connected to the other end of the heat storage heat exchanger 14 through the coolant tube; the port O of the fourth three-way valve 16 is connected to the other end of the battery pack 17 through the coolant tube; and the port P of the fourth three-way valve 16 is connected to the other end of the plate type heat exchanger 10 through the coolant tube.

The fourth three-way valve 16 can switch between three positions, which are a position by which N and O are in communication separately, a position by which N and P are in communication separately, and a position by which O and P are in communication separately.

A fan is disposed outside the outside-vehicle heat exchanger 3 and the inside-vehicle heat exchanger 6 respectively, and a pressure difference sensor is disposed outside the outside-vehicle heat exchanger 3 to determine whether frosting is present.

A temperature sensor is disposed inside the battery pack 17 to detect a temperature of the battery pack.

The plate type heat exchanger 10 can be provided for being passed through by a refrigerant and a coolant which are not in direct contact but exchange heat only through the plate type heat exchanger.

The heat storage heat exchanger 11 is provided with an internal channel for the coolant to flow through. Fins are disposed outside the internal channel to enhance heat exchange. The heat storage heat exchanger 11 is externally wrapped by the phase change material 15 which is externally wrapped by a heat insulation material. The phase change material is an inorganic or organic phase change material with a phase change temperature of about 30° C.

A medium in the refrigerant circuit is R134a; and a medium in the coolant circuit is water.

An electric control system of the vehicle is connected to the temperature sensor inside the battery pack 17 and the pressure difference sensor of the outside-vehicle heat exchanger 3. The electric control system may also control start and stop of the electric compressor 1, the fan of the outside-vehicle heat exchanger, the fan of the inside-vehicle heat exchanger and the water pump 12, the communication positions of the four-way directional valve 2, the first three-way valve 5, the second three-way valve 11, the third three-way valve 13, the fourth three-way valve 16, and the opened and closed states of the first gate valve 9 and the second gate valve 7.

The thermal management system has six working modes: a battery preheating mode, a battery heat accumulation mode, a battery cooling mode, a vehicle compartment refrigeration mode, a vehicle compartment heating mode and a defrosting mode.

Figure 2:
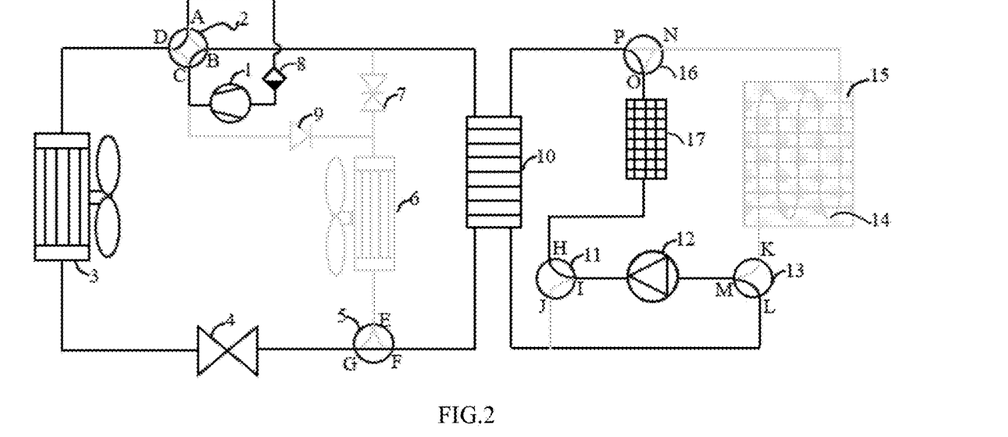
FIG. 2 is a schematic diagram of a battery preheating mode.

As shown in FIG. 2, when the battery pack 17 is cold-started, the temperature sensor of the battery pack detects the temperature of the batteries. If the temperature of the batteries is lower than a minimum value of a battery-suitable temperature, the thermal management system starts the battery preheating mode. The electric control system instructs the electric compressor 1 and the outside-vehicle heat exchanger to start, instructs the first gate valve 9 and the second gate valve to close, instructs the four-way directional valve 2 to switch to the position by which A and D are in communication and B and C are in communication, instructs the first three-way valve 5 to switch to the position by which F and G are in communication, instructs the second three-way valve 11 to switch to the position by which I and H are in communication, instructs the third three-way valve 13 to switch to the position by which L and M are in communication, instructs the fourth three-way valve 16 to switch to the position by which O and P are in communication, and instructs the water pump 12 to start. The high temperature and high pressure refrigerant flowing out of the outlet of the electric compressor 1 flows through the four-way directional valve 2 into the plate type heat exchanger 10 for heat release, and then through the first three-way valve 5 and the bidirectional electronic expansion valve 4 into the outside-vehicle heat exchanger 3 for heat absorption, and then through the four-way directional valve 2 into the gas-liquid separator 8 and then back to the electric compressor 1 and repeats as above. Under the drive of the water pump 12, the coolant flows between the battery packet 17 and the plate type heat exchanger 10, so that heat absorbed in the plate type heat exchanger 10 is transferred to the battery packet 17. When the temperature of the battery pack 17 is higher than the minimum value of the battery-suitable temperature, the electric compressor 1, the fan of the outside-vehicle heat exchanger and the water pump 12 are turned off. Under the battery preheating mode, the heat pump air conditioning system achieves heating for the battery pack 17, avoiding performance attenuation and shorter life span caused to the batteries under excessively low temperature.

Figure 3:
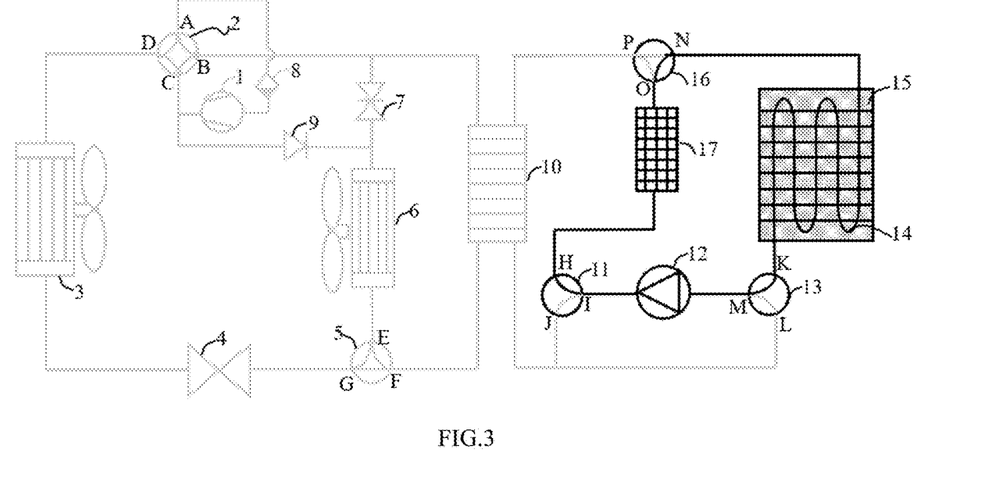
FIG. 3 is a schematic diagram of a battery heat accumulation mode.

As shown in FIG. 3, when the electric vehicle travels, that is, when the batteries are in working state, the thermal management system starts the battery heat accumulation mode while the temperature sensor constantly detects the temperature of the batteries. If the temperature is lower than the minimum value of the battery-suitable temperature, the heat accumulation mode is stopped immediately. Under the heat accumulation mode, the water pump 12 starts, the second three-way valve 11 switches to the position by which H and I are in communication, the third three-way valve 13 switches to the position by which K and M are in communication, and the fourth three-way valve 16 switches to the position by which N and O are in communication. Under the drive of water pump 12, the coolant flows between the battery pack 17 and the heat storage heat exchanger 14, such that the heat absorbed in the battery pack 17 is transferred to the heat storage heat exchanger 14 and then stored in the phase change material 15 through the heat storage heat exchanger 14. Under the battery heat accumulation mode, cooling is achieved for the batteries and waste heat recovery of the batteries is accomplished and then the heat is stored into the phase change material.

Figure 4:
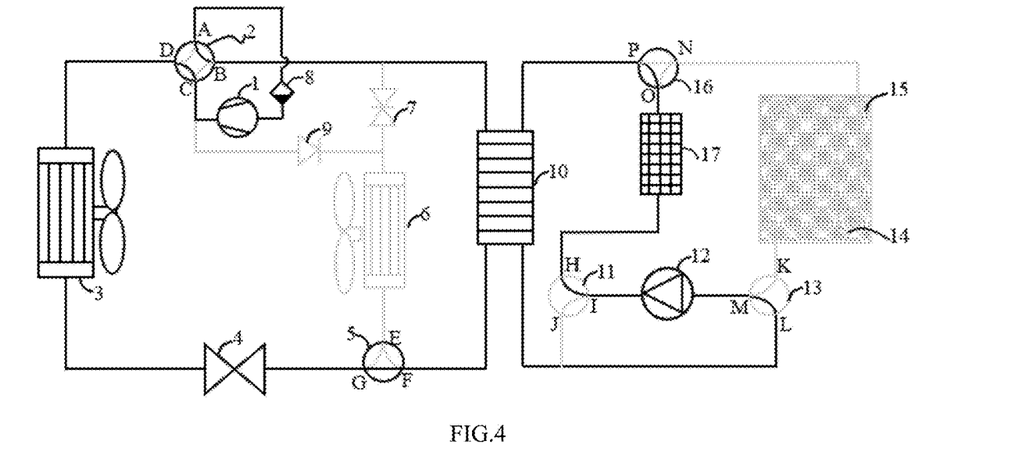
FIG. 4 is a schematic diagram of a battery cooling mode.

As shown in FIG. 4, when the temperature of the batteries is higher than the maximum value of the battery-suitable temperature, the thermal management system starts the battery cooling mode. The electric control system firstly starts the water pump 12, and meanwhile switches the second three-way valve 11 to the position by which H and I are in communication, switches the third three-way valve 13 to the position by which L and M are in communication, and switches the fourth three-way valve 16 to the position by which O and P are in communication. In this case, under the drive of the water pump 12, the coolant flows between the battery pack 17 and the plate type heat exchanger 10 such that the heat of the battery pack 17 is transferred to the plate type heat exchanger 10. Subsequently, the electric control system starts the electric compressor 1 and the fan of the outside-vehicle heat exchanger, closes the first gate valve 9 and the second gate valve 7, switches the four-way directional valve 2 to the position by which A and B are in communication and C and D are in communication, and switches the first three-way valve 5 to the position by which F and G are in communication. The high-temperature and high-pressure refrigerant flowing out of the outlet of the electric compressor 1 flows into the outside-vehicle heat exchanger 3 and releases heat to outside the vehicle in the outside-vehicle heat exchanger 3, and then flows through the bidirectional electronic expansion valve 4 and the first three-way valve 5 into the plate type heat exchanger 10 and absorbs the heat of the coolant in the plate type heat exchanger 10, and then flows through the four-way directional valve 2 and the gas-liquid separator 8 back to the electric compressor 1 and then repeats the above. Under the battery cooling mode, the battery pack 17 can be quickly cooled down by use of the refrigeration of the air conditioning system to ensure the battery pack 17 can be still maintained at an appropriate temperature after a high heat production operation, such as a long time of operation or high load operation.

Figure 5:
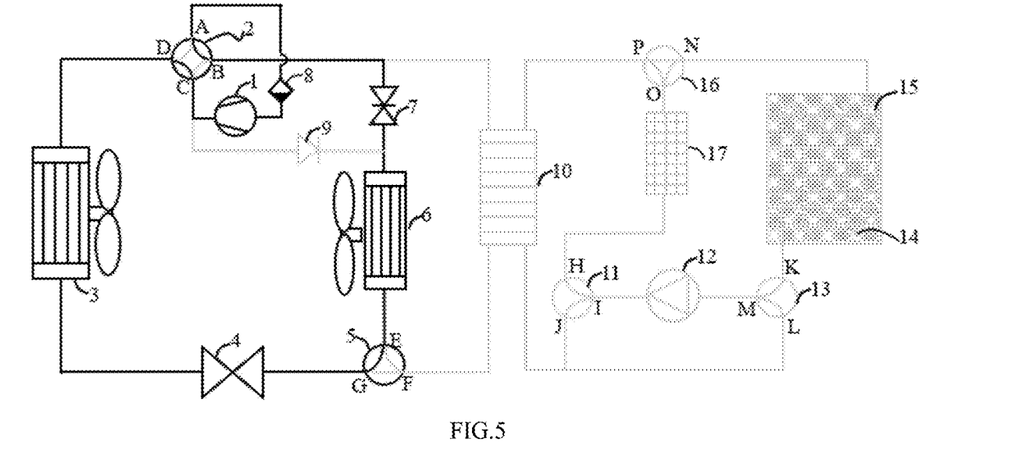
FIG. 5 is a schematic diagram of a vehicle compartment refrigeration mode.

As shown in FIG. 5, when a driver or passenger in the vehicle compartment starts the refrigeration mode of the air conditioner, the thermal management system starts the vehicle compartment refrigeration mode. The electric control system starts the electric compressor 1, the fan of the outside-vehicle heat exchanger and the fan of the inside-vehicle heat exchanger, closes the first gate valve 9, opens the second gate valve 7, switches the four-way directional valve 2 to the position by which A and B are in communication and C and D are in communication, and switches the first three-way valve 5 to the position by which E and G are in communication. The high-temperature and high-pressure refrigerant flowing out of the outlet of the electric compressor 1 flows into the outside-vehicle heat exchanger 3 and releases heat to outside the vehicle in the outside-vehicle heat exchanger 3, and then flows through the bidirectional electronic expansion valve 4 and the first three-way valve 5 into the inside-vehicle heat exchanger 6 to absorb the heat inside the vehicle and then flows through the four-way directional valve 2 and the gas-liquid separator 8 back to the electric compressor 1 and then repeats the above. If the battery cooling mode is also started under the vehicle compartment refrigeration mode, it is only required to switch the first three-way valve 5 to the position by which E and G are in communication and F and G are in communication on the basis of the battery cooling mode and the vehicle compartment refrigeration mode.

Figure 6:
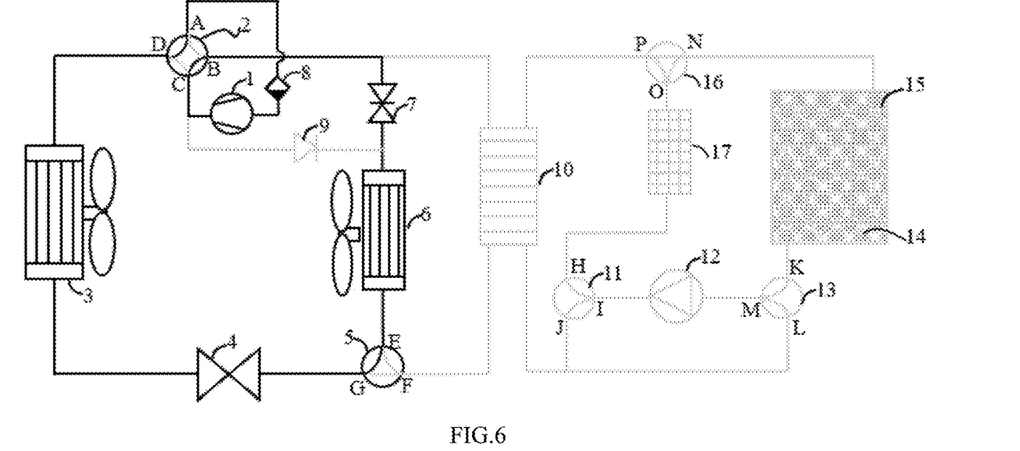
FIG. 6 is a schematic diagram of a vehicle compartment heating mode.

As shown in FIG. 6, when a driver or a passenger in the vehicle compartment starts a heat function, the thermal management system starts the vehicle compartment heating mode. The electric control system starts the electric compressor 1, the fan of the outside-vehicle heat exchanger and the fan of the inside-vehicle heat exchanger, closes the first gate valve 9, starts the second gate valve 7, switches the four-way directional valve 2 to the position by which A and D are in communication and B and C are in communication, and switches the first three-way valve 5 to the position by which E and G are in communication. The high-temperature and high-pressure refrigerant flowing out of the outlet of the electric compressor 1 flows into the inside-vehicle heat exchanger 6 and releases heat into the vehicle compartment in the inside-vehicle heat exchanger 6, and then flows through the first three-way valve 5 and the bidirectional electronic expansion valve 4 into the outside-vehicle heat exchanger 3 to absorb heat from outside the vehicle, and then flows through the four-way directional valve 2 and the gas-liquid separator 8 back to the electric compressor 1 and then repeats the above. If the battery preheating mode is also started under the vehicle compartment heating mode, it is only required to switch the first three-way valve 5 to the position by which E and G are in communication and F and G are in communication on the basis of the battery preheating mode and the vehicle compartment heating mode.

Figure 7:
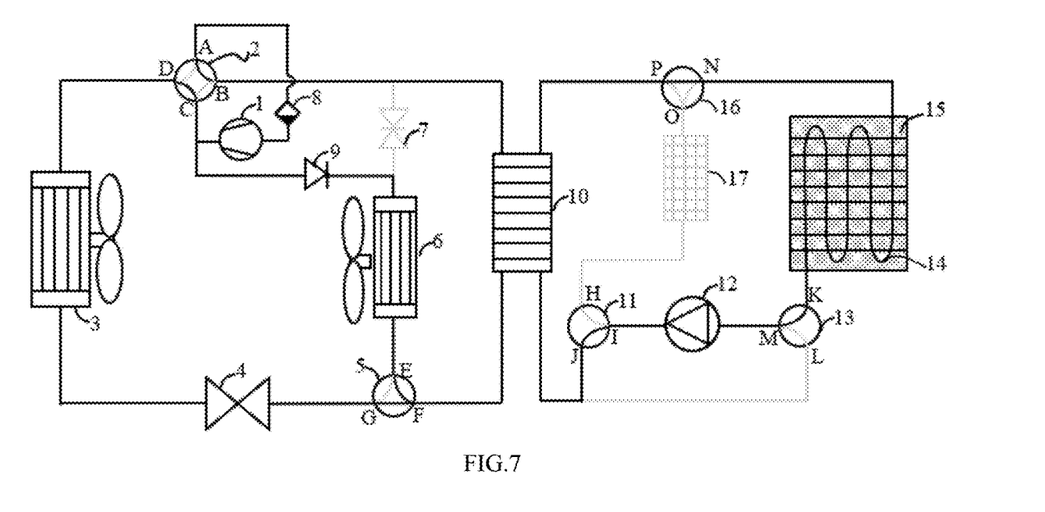
FIG. 7 is a schematic diagram of a defrosting mode.

As shown in FIG. 7, during a process of using the vehicle compartment refrigeration mode in winter, when the pressure difference sensor of the outside-vehicle heat exchanger detects an inlet-outlet pressure difference at the air side of the outside-vehicle heat exchanger is excessively high, the thermal management system starts the defrosting mode. The water pump 12 is first started, the second three-way valve 11 is switched to the position by which I and J are in communication, the third three-way valve 13 is switched to the position by which K and M are in communication, and the fourth three-way valve 16 is switched to the position by which N and P are in communication. The coolant in the coolant tube flows between the heat storage heat exchanger 14 and the plate type heat exchanger 10, such that the heat in the phase change material 15 is transferred to the plate type heat exchanger 10. Subsequently, the electric compressor 1, the fan of the outside-vehicle heat exchanger and the fan of the inside-vehicle heat exchanger are started, the first gate valve 9 is started, the second gate valve 7 is closed, the four-way directional valve 2 is switched to the position by which A and B are in communication and C and D are in communication, and the first three-way valve 5 is switched to the position by which E and F are in communication and F and G are in communication. The refrigerant absorbs the heat of the coolant in the plate type heat exchanger, and then flows through the four-way directional valve 2 to the electric compressor 1 for being compressed into high temperature and high pressure state, and then flows into the outside-vehicle heat exchanger 3 and the inside-vehicle heat exchanger 6 respectively and then flows through the first three-way valve 5 back to the plate type heat exchanger 10 and then absorbs heat again and then repeats the above. Under the defrosting mode, the waste heat of the batteries stored in the phase change material 15 is carried by the coolant to the plate type heat exchanger 10, and then exchanged between the refrigerant and the coolant in the plate type heat exchanger 10 to supply heat for defrosting of the outside-vehicle heat exchanger and inside-vehicle heating.

Of course, the above descriptions are made not to limit the present invention and the present invention is not limited to the above examples. All changes, variations, additions or substitutions made by those skilled in the art within the essence of the present invention shall all fall within the scope of protection of the present invention.

The invention claimed is:

1. A coupling thermal management system of a pure electric vehicle based on phase change heat storage, comprising a refrigerant circuit and a coolant circuit, heat exchange being achieved between the refrigerant circuit and the coolant circuit through a plate type heat exchanger;

the refrigerant circuit comprising an electric compressor, an inside-vehicle heat exchanger, an outside-vehicle heat exchanger, a bidirectional electronic expansion valve, a four-way directional valve, a gas-liquid separator, first three-way valve, a first gate valve, a second gate valve, the plate type heat exchanger and a refrigerant tube;

wherein the four-way directional valve is provided with 4 ports which are a port A, a port B, a port C and a port D respectively; the port A of the four-way directional valve is connected to an inlet of the electric compressor through the gas-liquid separator; the port B of the four-way directional valve is connected to an end of the plate type heat exchanger through the refrigerant tube, and connected to an end of the inside-vehicle heat exchanger through the second gate valve; the port C of the four-way directional valve is connected to an outlet of the electric compressor through the refrigerant tube, and connected to an end of the inside-vehicle heat exchanger through the first gate valve; the port D of the four-way directional valve is connected to an end of the outside-vehicle heat exchanger through the refrigerant tube;

the first three-way valve is provided with 3 ports, which are a port E, a port F and a port G respectively; the port E of the firs three-way valve is connected to the other end of the inside-vehicle heat exchanger through the refrigerant tube; the port F of the firs three-way valve is connected to the other end of the plate type heat exchanger through the refrigerant tube; the port G of the first three-way port is connected to the other end of the outside-vehicle heat exchanger through the bidirectional electronic expansion valve;

the coolant circuit comprises a battery pack, a phase change material, a heat storage heat exchanger, a water pump, a second three-way valve, a third three-way valve, a fourth three-way valve and a coolant tube; the plate type heat exchanger is also comprised in the coolant circuit;

the second three-way valve is provided with 3 ports, which are a port H, a port I and a port J respectively; the port H of the second three-way valve is connected to an end of the battery pack through the coolant tube; the port I of the second three-way valve is connected to an outlet of the water pump through the coolant tube; the port J of the second three-way valve is connected to an end of the plate type heat exchanger and a port L of the third three-way valve through the coolant tube;

the third three-way valve is provided with 3 ports, which are a port K, a port L and a port M respectively; the port K of the third three-way valve is connected to the heat storage heat exchanger through the coolant tube; the port L of the third three-way valve is connected to an end of the plate type heat exchanger and the port J of the second three-way valve through the coolant tube;

and the port M of the third three-way valve is connected to an inlet of the water pump through the coolant tube;

the fourth three-way valve is provided with 3 ports, which are a port N, a port O and a port P respectively; the port N of the fourth three-way valve is connected to the other end of the heat storage heat exchanger through the coolant tube; the port O of the fourth three-way valve is connected to the other end of the battery pack through the coolant tube; and the port P of the fourth three-way valve is connected to the other end of the plate type heat exchanger through the coolant tube;

the four-way directional valve switches between two positions, which respectively are: a position by which A and B are in communication, and C and D are in communication; and a position by which A and D are in communication and B and C are in communication; the first gate valve is opened or closed; and the second gate valve is opened or closed;

the first three-way valve switches between five positions: which are a position by which E and F are in communication separately, a position by which F and G are in communication separately, a position by which E and G are in communication separately, a position by which the E and G are in communication and F and G are in communication, and a position by which E and F are in communication and F and G are in communication;

the second three-way valve switches between two positions, which are a position by which H and I are in communication separately and a position by which I and J are in communication separately;

the third three-way valve switches between two positions, which are a position by which K and M are in communication separately and a position by which L and M are in communication separately;

the fourth three-way valve switches between three positions, which are a position by which N and O are in communication separately, a position by which N and P are in communication separately, and a position by which O and P are in communication separately;

a fan is disposed outside the outside-vehicle heat exchanger and the inside-vehicle heat exchanger respectively, and a pressure difference sensor is disposed outside the outside-vehicle heat exchanger to determine whether frosting is present;

a temperature sensor is disposed inside the battery pack to detect a temperature of the battery pack;

the plate type heat exchanger is provided for being passed through by a refrigerant and a coolant which are not in direct contact but exchange heat only through the plate type heat exchanger.

2. The coupling thermal management system of claim 1, wherein the heat storage heat exchanger is internally provided with an internal channel for the coolant to flow through; fins are disposed outside the internal channel to enhance heat exchange; the heat storage heat exchanger is externally wrapped by the phase change material which is externally wrapped by a heat insulation material.

3. The coupling thermal management system of claim 1, wherein a medium in the refrigerant circuit is R134a; and a medium in the coolant circuit is water.

4. The coupling thermal management system of claim 1, wherein the thermal management system has six working modes: a battery preheating mode, a battery heat accumulation mode, a battery cooling mode, a vehicle compartment refrigeration mode, a vehicle compartment heating mode and a defrosting mode.

* * * * *